United States Patent Office 2,855,725
Patented Oct. 14, 1958

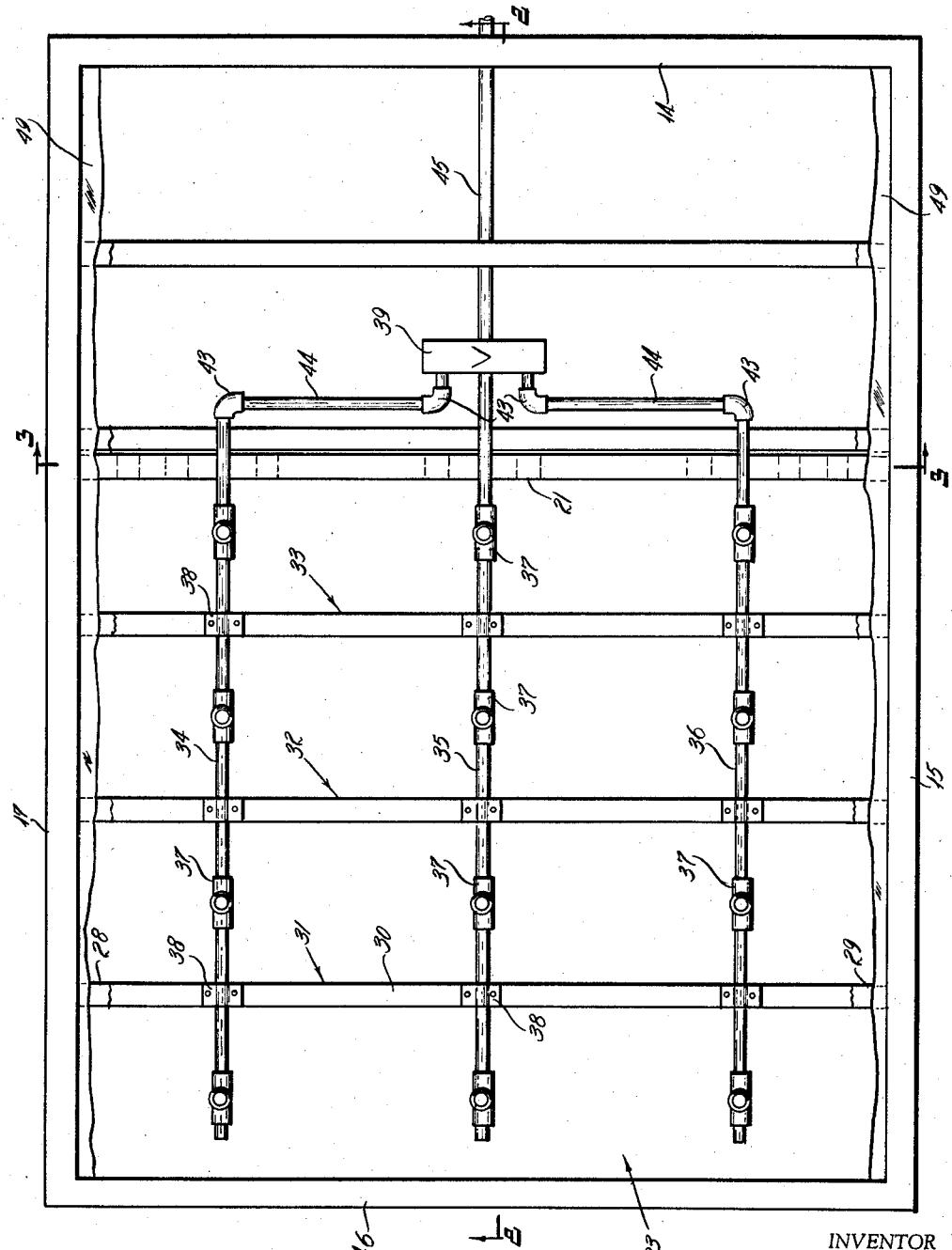

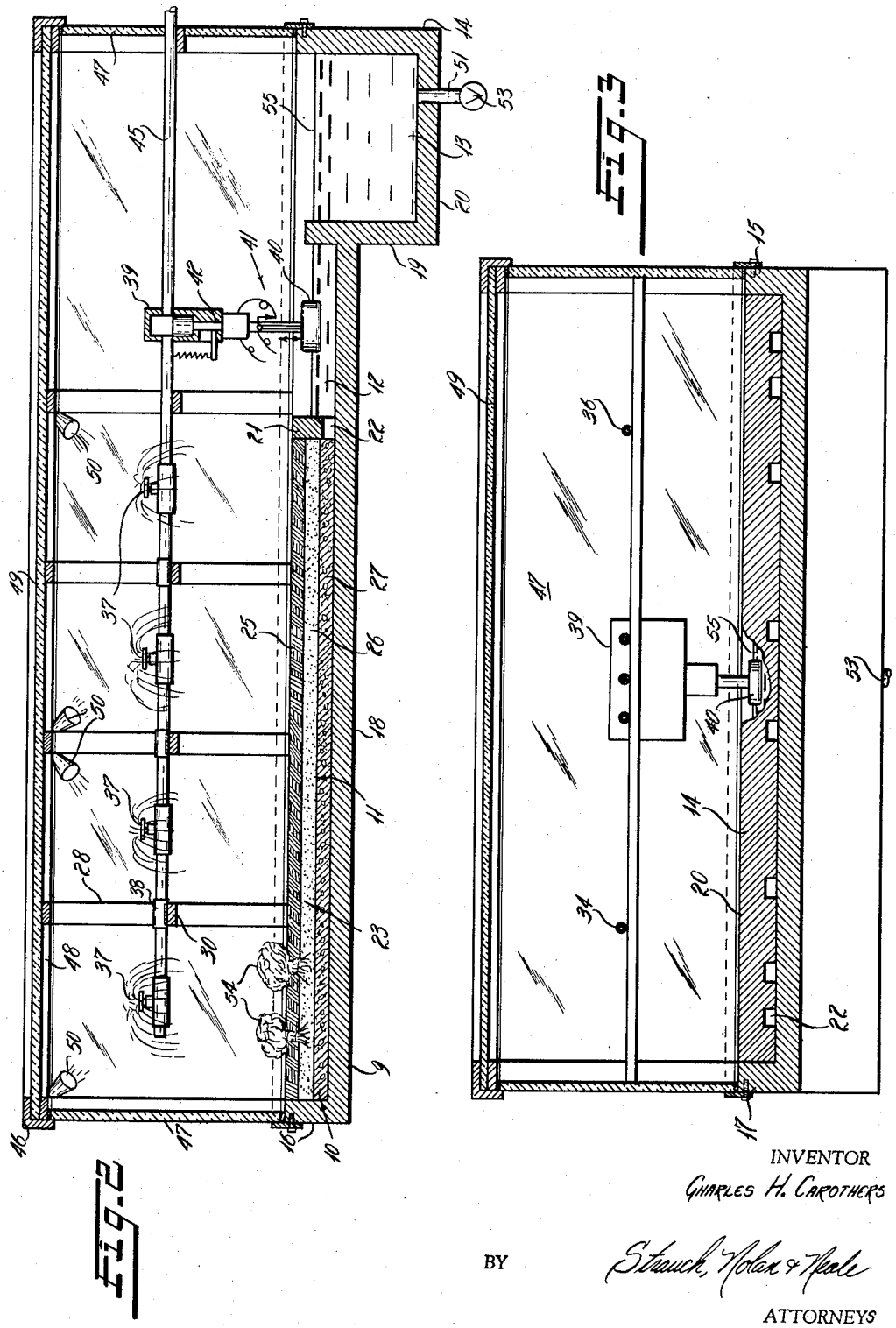

2,855,725

METHOD AND MEANS FOR AUTOMATICALLY GROWING IMPROVED QUALITY PLANTS

Charles H. Carothers, Miami, Fla.

Application June 25, 1956, Serial No. 593,665

14 Claims. (Cl. 47—17)

The present invention relates to the agricultural arts and particularly to the art or science of cultivation and the production of crops of uniformly standard high quality. More specifically this invention relates to a method of and an apparatus for automatic gardening through use of which the automatic production of crops is possible.

The basic aspiration which underlies all agricultural research, experimentation and development is the production of more and better crops with less effort and expense. Thus in common with technologists in other fields, agriculturalists hope to relieve man of burdensome toil and allow him to devote more of his time to leisure or more enjoyable productive activities, while providing food and plant life of uniform and superior quality. In their own sphere, agronomists are seeking to benefit the whole of mankind by the development and improvement of agricultural methods and apparatus through the production of more and better crops.

Drought, pestilence, denudation of the soil, and the growth of undesirable plants and weeds have always plagued agriculturalists and mankind in general and these problems have been attacked since the time of the earliest recorded efforts in the art. Untiring efforts have been made by vast multitudes of scientists and others: tillers of the soil, commercial farming syndicates, universities, farm suppliers and governments have all devoted uncountable amounts of time and monies to the improvement of agriculture and, thus, to the benefit of the farmer and the diet and health of all.

As a result of such efforts many agricultural methods, apparatus, chemicals and equipment have been devised with a view toward increasing yield, decreasing labor, protecting crops, protecting and revitalizing the soil and improving product quality.

Despit these monumental labors the unruly elements and the vagaries of nature are still dominant factors in agriculture. Further, increasing population, the scarcity and soaring costs of labor, and the increased costs of farming in general have accelerated the necessity of more quickly extending the development of agriculture.

It has long been recognized that it would be highly desirable to have methods of cultivating crops on both large and small scales which would reduce or substantially eliminate cultivation and fertilization by the common wasteful and expensive methods and would considerably reduce the amount of machinery, labor and attention required. Further it has also been a prime object of many scientific endeavors related to agricultural methods or apparatus to obtain the maximum yield with a given acreage and to reduce or conquer the deleterious effects of the natural environment of the crops. In striving toward these objectives many methods, equipments and procedures have been developed to aid the farmer in the production of an abundant crop at reasonable cost and in an otherwise satisfactory manner. As an example of the results of these efforts: it is apparent that the increasing cost and scarcity of labor has been met, at least to a certain extent, thru development of machinery leading to the mechanization of farming. Despite all these efforts however the need for substantial improvement remains. In particular, there is great need for a farming method and apparatus which considerably reduces the risk involved in agriculture, as presently known, and yet which further reduces the cost, results in even more productive and otherwise more perfect crops and which, in its broader implications, further results in another step forward in the effort of man to free himself from labor, to control his surroundings more accurately, and to devote himself to tasks other than the production of the necessities of his physical being.

The ultimate in agricultural methods and apparatus would of course provide a completely automatic growing of crops of the most perfect quality and quantity with no need for mechanical cultivation, with thorough protection from the elements and pestilence, and without reliance even on the vagaries of the sun or other natural elements.

In recognition of this many of the labours mentioned above have been directed to the development of methods and apparatus leading towards this ultimate objective. Thus experiments in this direction have led to the development of the art of hydroponics. Further, methods and apparatus for supplying nutrients and water to growing plants have been developed and produced which approach being automatic in nature insofar as, for example, a degree of saturation of plant supporting soil or strata may be concerned, or insofar as the level of liquid in tanks may be concerned. These experiments and developments have resulted in, methods and apparatus such as disclosed in United States Letters Patents to W. M. Hansen No. 2,152,254, dated March 28, 1939; H. Meissl, No. 2,183,970, dated December 19, 1939; G. E. Barnhart, No. 2,198,150, dated April 23, 1940; F. W. Brundin, No. 2,249,197, dated July 15, 1941; and L. Sejarto, No. 2,336,755, dated December 14, 1943.

The methods or apparatus disclosed in the above patents relate to means for supplying nutrient containing liquids to growing plants. In some instances these liquids are supplied to the soil in which the plants are growing, whereas in others the plant roots are grown in the liquid itself and supported by means such as excelsior as in the Barnhart patent. In all instances, however, these prior known methods and apparatus suffer from certain disadvantages, the most important of which is the difficulty in controlling the supply of fluid medium and the proper amounts of nutrients to the plants. All these teach a direct attempt to produce solutions containing the food for the plants in proper proportions, with due regard to the toxic qualities of these nutrients if proper balance is not maintained, and an attempt to supply this fluid food to the plants. As a result, these heretofore known methods and apparatus required constant supervision. Even with such supervision the delicate chemical balances required were difficult to maintain. Thus there is constant danger of damage to the growing plants as well as continuous expense and care. As a result the intended advantages of the proposed methods and apparatus were more than outweighted by the inherent disadvantages.

Such prior known apparatus undoubtedly represent the culmination of attempts to develop gardening methods and apparatus useful for the production of crops on a commercially successful scale wherein the influence of the natural environmental elements is minimized. However, for reasons heretofore stated these methods do not embody automatic gardening in accordance with the concepts of the present invention as set forth above and appears hereinafter. In view of this background of the art and the need for advance briefly touched on above, it is accordingly an object of this invention to provide an agricultural method and apparatus for the true automatic production of crops with which automatic gardening becomes a realization and not a dream just beyond the grasp.

A further object of this invention is to provide a gardening method and apparatus utilizing natural plant food and natural plant supporting substances as found in a growing field or bed for both sustaining the plants or vegetation in their proper positions and also as a supply of nourishment for feeding and developing the plants. This is in marked contrast to the heretofore known devices such as described above in which chemical solutions are developed extraneously of the growing field or bed and unnatural root environment is maintained.

The terms "growing field" or "garden" or "bed" as here used means the supporting and nurturing medium or soil in which the plants are maintained in growth. As pointed out above the proposed prior methods required constant close observation during the growing and fruiting life. According to the instant invention, however, the plant life is nurtured by natural plant food not just artificially prepared chemical preparations and as a result constant supervision is unnecessary and the possibility of damage to the plants is reduced.

The crops which are presently grown on a large scale are grown in soil in fields or gardens or beds of varying sizes and the words field, garden, and bed are commonly used in referring to such growing areas. Herein the words "growing field" or "garden" or "bed" are used not only to include such natural areas which exist in nature (which may, nonetheless, be unnaturally fertilized, etc., by known methods) modified to adapt them to utilization of the present method but also to include artificially created areas such as might be developed within an enclosed chamber or broadly speaking a container. The terminology "farming area" is used herein to designate an area which includes a field and sections containing means or apparatus facilitating the development of crops in the field in accord with this invention. The terminology "soil" or "natural soil" is here used to designate broadly any source of natural or artificial nutrient fortified earth, peat moss or the like for supporting plants and such connotations are intended herein.

As will be apparent from a further perusal of this specification the objects of this invention include those of providing a plant environment embodying a composition and arrangement productive of the most desirable of crops and also consisting of natural plant elements.

A further object of the instant invention is to use a natural soil such as described above both as a means for supporting the plants during growth and as a means for retaining the nutrients to be released thereto in marked contrast to the use of a comparatively pure or chemically inert supporting means for plants coupled with artificially prepared solutions as a means for feeding the plants.

A further object of this invention is to provide automatic farming methods utilizing nutrient fortified soil and a means for controllingly releasing the soil retained nutrients to the plants as required.

Yet another object of the invention is to provide a farming method including a means to define moisture isolated farming area in which the growth and developing of the plants takes place and the feeding and sustaining operations are carried out. In accordance with the invention it is preferred that the growing area be defined by a container like formation within which the soil and moisture is confined and the automatic operations are carried out.

A still further object of the invention is to provide a farming method and apparatus embodying soil and moisture container partitioned to provide a solution reservoir a part of which is filled with superimposed layers of rock, sand and humus, the humus being the uppermost layer and constituting the means for storing nutrients to be controllably released at a predetermined rate for feeding the plant during the entire growing and fruiting life of the plant.

A still further object of this invention is to provide a field of soil for the automatic growing of plants comprising an upper layer of humus, an intermediate layer of sand and a lower layer of rock and means for controllably releasing the nutrient elements contained in the humus layer and transferring the proper amounts to growing plants supported in the humus.

An additional object of this invention is to provide a gardening method and apparatus having a soil supporting the plant and including a substrata of rock and means for releasing the minerals contained in the soil and rock for the purpose of nourishing the plants.

Still another object is to provide apparatus in accordance with the foregoing objects involving means for controllably releasing or dissolving the plant nutrients in the humus and rock and supplying the latter to the plants supported for development in the soil, and in a manner which requires no close observation but which insures a proper feeding at all times governed by the needs of the plants.

A further object of the invention resides in provision of means for periodically spraying the humus layer with water under pressure to leach out and transmit nutrients to the plants under control of the assimilation of moisture by the plants and losses of moisture through exaporation or other means.

It is also an object of the invention to provide a soil as described heretofore superposed on a layer of sand which serves as a filter to filter out undissolved and unoxidized organic particles which may be present in the solution of water and chemicals leached out of the soil thereby preventing these toxic elements from reaching the roots of the plants and putrefying in solution so as to produce an unduly high biochemical oxygen demand content in the automatically maintained solution used to nurture plant life.

Additional objects of the invention are to provide automatic gardening apparatus embodying means for automatically supplying water or other fluids to growing plants supported in the soil, as described herein, in accordance with a water table or moisture level in such soil; means for supplying chemical means for destroying pestilences, for example; means for controlling the exposure of crops to sunlight; and means for supplying artificial radiant energies to facilitate plant growth and to protect plants by destroying insects.

The ultimate object of the invention, therefore, is to provide a truly automatic garden, one which can be left unattended for long periods of time yet without danger of being overrun with insects, undesirable weeds or other vegetation and yet which will produce crops of superior quality and high yield in a minimum time.

These and other objects of the invention will become apparent from the following description when read in conjunction with the appended claims and accompanying drawings.

Wherein:

Figure 1 is a top plan view of a garden embodying the instant invention:

Figure 2 is a sectional view taken along line 2—2 of Figure 1; and

Figure 3 is a sectional view taken along line 3—3 of Figure 1.

With continued reference to the drawings, wherein like parts throughout the several figures are identified by the same reference numerals, a preferred embodiment of a garden constructed in accordance with the instant invention comprises a receptacle or container like means 9 defining the extremities of a farming area 10. The latter is divided into a field 11 in which the plant life is sustained having along one side a control chamber 12 and a sump or overflow chamber 13. The lateral extremities of farming area 10 is defined by side walls 14, 15, 16 and 17. The growing area 11, control chamber 12 and sump or overflow chamber 13 are defined, in cooperation with these side walls, by a base 18 which extends laterally between side walls 15 and 17 and from side wall 16 towards side wall 14 stopping short of side wall 14 at an upstanding intermediate wall 19. In this regard, it is to be noted, that the upper edge of walls 14, 15, 16, and 17 (Figures 2 and 3) lie in a common horizontal plane but the upper edge of wall 19 is spaced below this plane for a purpose which will be hereinafter apparent. A second base 20 extends from intermediate wall 19 to side wall 14 and together therewith forms a sump tank for holding and eliminating excess or spent solution from the farming area. It is clear from the drawings that walls 19 and 14 extend downwardly below base 18, and the wall 19 merges with the side walls 15 and 17 at its extremities.

A second intermediate wall 21 rises upwardly from base 18 at a point spaced from wall 19 and extends laterally from wall 17 to wall 15 thus forming with wall 19 and base 18 a control chamber. The wall 20 at its juncture with base 18 is perforated by means such as laterally spaced openings 22. This construction thus forms a pervious bulk head and wall member 21 will be hereinafter referred to as the bulk head. Bulk head 21 and walls 15, 16, 17 together with base 18 define the boundaries of the growing field 11 within which the plants are to be sustained and nurtured automatically.

In further carrying out the invention the growing field 11 is filled with a special layered fill 23. This fill 23 comprises an upper layer of soil or humus 25, an intermediate layer of sand or similar fine filtering and capillary passage forming aggregate 26 and a lower layer of rock or stones or like inert mineral aggregate 27. The humus is made up of manures, peat moss, bone meal and so forth or weed free earth containing manures, bone meal and peat moss cultured with aerobic bacteria. These materials can be combined in proportions most suitable for the type of plants to be grown so long as the humus layer will remain porous. Such mixtures are within the everyday knowledge of gardeners or horticulturalists skilled in the art. In this connection, it is well known that certain soils have the ability to best develop certain varieties of plants in a manner more satisfactory than other types of soils. The selection of the soil fill for the type of crop to be grown, as stated before, is a step all modern gardeners are aware of and capable of performing. The humus mixture is preferably moistened, aerated, cultured and composted for a length of time judged to be satisfactory to produce a uniform mixture.

The humus layer 25 thus contains natural plant food and is chosen as a type of material which many gardeners employ for the choicest of their plants. Although it may be expensive as compared to common arable land which may be purchased it is intended that this form a part of the method and apparatus for producing and utilizing an automatic gardening principle and its initial cost will be more than offset by the savings which will become apparent as this description proceeds.

The sand layer 26 has a dual purpose, namely, a filtering action on the descending water solution passing through humus layer 25 and a capillary action in transmitting the nutrient solution from the rock layer upwardly to the plant roots between the intermittent spraying of he growing field. This layer of sand thus may comprise any media which will produce a satisfactory filtering and capillary action. As in the case of the use of the word humus as referring to the mixture of material in the humus layer 25, the word sand is used in the generic sense to describe all such filtering and capillary media.

Further it is true also that the rock layer 27 may comprise mixtures of varying grades of rock. Although it is preferred that a uniform gradation be employed, the size or grade of the rock used may be varied as experience dictates. The function of the rock area is to provide a catch basin area into which the nutrient solutions described hereinafter may percolate in a desirable manner to be trapped and held in the manner of percolating underground water normally present in many strata of the earth. Another function of the rock area is to provide a readily available, constantly regulated food source for the plants as described below.

With the three layers 25, 26 and 27 in place as described there has thus been established a garden fill having a high type of natural food within which plant life may be developed on a most satisfactory scale. Howsoever, there remains the problem of moisture and the embodiment of automatic means for controlling and assuring flourishing plants including means for controllably releasing the nutrients in the soil.

Generally speaking the latter is accomplished by depositing water on the upper surface of the humus layer, whereupon the water will percolate through the upper strata and leach out the nutrients through natural reactions and the resulting solution will then filter through the sand layer where undissolved organic particles are removed thereby reducing putrescibility and biochemical oxygen demand in the filtrate solution reaching rock layer 27. The acidic constituent of the resulting filtrate solution will react with the rock particles of layer 27 releasing the mineral content thereof. Preferably the water is supplied to the upper humus layer from overhead sprays arranged to distribute the water evenly over the growing area until a desired water table is established within the field. The level of the table is preferably up to or just into the sand layer. The level will be apparent in the control chamber 12 due to the pervious nature of bulkhead 21. The control chamber provides a means for visual indication of the water table height and space to house mechanism to facilitate control of such height by automatic control means. To this end, the farming area further comprises a series of vertical and lateral support members such as vertical posts 28, 29 adapted to carry lateral support members 30. The vertical posts 28, 29 and support members 30 form support units such as 31, 32 and 33 positioned at spaced intervals along the parallel sides 15 and 17. Posts 28 and 29 can comprise wooden members supported on the side walls 15 and 17 in any suitable manner. The support members 30 likewise can comprise wooden members connected to the post 28, 29 by any suitable fastening means. Obviously the members 28, 29 and 30 may be formed of any suitable material.

The lateral support members 30 are adapted to provide support for spaced runs of pipe or conduit 34, 35 and 36. The latter pass over and rest upon the lateral support members 30, and are each provided with spaced spray heads 37. The pipes may be fixedly positioned on the lateral support members 30 by any suitable clamps 38.

The conduits 34, 35 and 36 are connected to a valve box V in which a fluid control valve is located. This valve can be a flow control valve of any suitable construction and is utilized to control the flow of water from a common source to the conduits. The valve preferably comprises a solenoid valve generally indicated at 39. The latter is controlled by a float 40. The arrangement includes a switch 41 operated by the float and an operating rod 42 connecting the solenoid and the valve. The construction is such that the switch will close to operate the valve at a desired minimum height of the fluid within the float control chamber 12 and will operate to close the valve when the fluid assumes a higher position. The conduits are connected to the valve box by elbows 43 and laterals 44 as may be necessary. It is considered that the construction of or purchase of the valves, switches, etc., and the connection of the conduits to the valve, etc. are obviously within the knowledge and skill of the average plumber and accordingly no detailed disclosure of these features is made herewith. Suffice to say that here the three conduits are connected to the valve so that when the valve opens water or other fluid from main or pipe 45 connected to a suitable pressure source will flow into the conduits. The fluid supply main 45 can be connected directly to the local water supply or other source of irrigating water and can be tapped or diverted or intercepted to introduce chemical agents such as fungicides and insecticides, if desired, as will be obvious to those skilled in the art. Here again it is understood that the manner of connecting the main 45 to the valve is obviously within the skill of those working in the field of irrigation or plumbing in general.

The accomplishment of the objects of the instant invention can be facilitated even further by providing protection from the natural elements, and insects, and also by providing energy in controlled amounts. For example: the growing field or farming area may be provided with frame members such as lateral elements 46 and vertical elements 47. The members 46 and 47 support translucent panel members 48 and 49 of glass, plastic, wire or other reticulated screening or the like. There is thus provided a frame or upper enclosure for the field to prevent the influx of insects, and to diffuse the light. If desired, shutters or foldable screen members of flexible opaque material or flexibly interconnected opaque strips may be used in place of or with panel to control or eliminate direct sunlight.

In addition artificial energy means such as radiant energy devices 50 may be supported on the frame or enclosure and directed to supply energy in the form of ultraviolet or heat rays to promote proper development of the plant life or to destroy fungus for example.

A drain 51 is preferably provided in the sump tank for the obvious purpose of draining the latter. The growing area also can be drained through the provision of a valve (not shown) interconnecting the control chamber and the sump. The drain 51 is provided with a valve 53. Thus the entire field can be drained for purposes of replacing or introducing the solution in the rock layer 27 and flushing the farming area or for other reasons which may render such desirable or necessary. The sump will accommodate overflow due to storms where the garden area is in the open exposed to the elements and the height of the upper edge of wall 19 automatically determines the maximum height of the water table.

In performing the instant farming method plant life such as the cabbage 54 is set out in the humus layer after which the roots of the cabbage will develop through the sand layer toward the rock layer. During this time water is intermittently supplied to the growing field through the spray heads 37 to establish and maintain the desired fluid level 55 in the control chamber 12. The water table in the fill is thus established. At this point the automatic valve operation will shut off the flow of water. Thereafter, the water level is mechanically monitored by the float and water will be automatically added to maintain the water table level. Obviously the float can be adjustable to adjust the cut off point. As the water is sprayed outwardly of the spray heads it is deposited on the humus layer. This water will trickle through the humus layer and in doing so will unite with or dissolve nutrient elements from the humus including the bacterially produced chemicals. This solution then filters through the sand layer into the rock layer wherein the solution is collected to maintain the intermediate fill layer moist thereby creating a capillary movement of the solution upward to the plant roots as the plant assimilates the nutrient solution in the sand and contiguous portions of the humus layers and evaporation at the upper surface dries out the humus layer. Also the root development is downward toward the moist area thus utilizing the natural root growing habits to further assure a constant supply of dissolved nutrients to the plants.

The organic humus material 25 contains bacteria, either natural or supplied by the preparers of the growing medium, and this bacterially rich organic humus material gives, as heretofore mentioned, a natural plant growing medium. This food is delivered to the plants in a solution which has been filtered thru a sand layer. In the latter layer unoxidized and otherwise undesirable organic particles are filtered out. Thus there is no putrification of the water solution in the rock layer, and the biochemical oxygen demand in the lower layer is also reduced.

As pointed out above, the solution formed in the humus layer is an acidic solution and this will react with the rock in the rock layer to release further minerals in a usable form thereby further contributing to the development of the crop. Also, the mineral salts will go into solution and not only feed roots in the lower layer but through capillary action will reach the upper roots of the plants. Furthermore, due to the automatic intermittent spray supply of water, the plants are not subjected to periodic periods of drought which interrupt normal plant growth activity causing inferior drought damaged plants with the result that plants and plant fruit of the most perfect high quality are uniformly assured. Spent humus is replaced as needed as is also the loss of humus occurring during harvesting.

From the foregoing description of the method and apparatus it is apparent that the instant method consists of the steps of providing an artificially defined growing area, creating an artificially constructed soil comprised of natural soil elements arranged in a layered manner with an upper layer adapted to support plant life and composed of a natural plant food and supporting means, an intermediate filtering layer and a lower layer for root feeding of the plants, the developing of a water table within the growing area by intermittently depositing water on the upper humus layer and filtering of the same through the humus and sand layers into the lower rock layer to control the water table or solution level within the rock area thereby assuring growing conditions of maximum efficiency at all times. Stated differently the novel method of this invention may be considered to consist of the preparation of an artificial growing field formed of natural soil elements, the placing of plant life therein, the establishment of a water table in the field to assure constant uniform feeding of the roots of said plant life and a continuous automatic supervision or monitoring of the water table in the field together with the spraying of fluid over the upper layer of the field to maintain the water table within the field and assure automatic replenishment of the table water with active plant nutrient capable of assuring continuous plant growth.

Thus, according to the method of this invention a growing field is provided within an inclosed area. The growing field is formed of natural plant sustaining elements arranged in an upper food and plant supporting layer, an intermediate filtering layer and a lower plant food supply area in the form of a water table of a solution containing the natural food elements found in the soil. The water level is maintained automatically by mechanical monitoring of the water table by automatically supplying water in additional amounts as needed to the upper surface of the upper layer. The invention therefore is an automatic farming method or automatic method of plant culture comprising placing plant life in a soil, establishing a determined water table in the soil, and supplying water to the upper surface of the soil to maintain a predetermined desired water table.

According to the instant method and apparatus plant life once established in the growing field is automatically nurtured and developed to its final stage. Attendants, chemical analysis, and constant supervision are eliminated. Further reliance upon the natural elements with consequent likelihood of sudden loss or damage to crops is eliminated. Plants are grown under the most ideal conditions and develop in the quickest time with the maximum yield and the highest quality.

The apparatus constructed in accordance with the instant invention is not only useful in large commercial undertakings but is a boon to the average small grower of vegetables or other products who likes to develop his own home products. Such an agricultural method or system, and apparatus, as disclosed herein can be employed in a garage where, for example, one can initiate the growing of a vegetable crop, go away on a vacation and return and find his crop fully developed without any attention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of agriculture comprising providing a confined plant supporting medium containing non-assimilatable plant nutrients, establishing a growing crop in said medium, establishing a nutrient solution water table for said medium, automatically mechanically monitoring the height of said water table and periodically supplying water to the upper surface of said medium as the plants assimilate said nutrient solution from said established water table to maintain the level of said water table through percolation of said periodically supplied water through said medium thereby effecting an incremental leaching out of the nutrients into a solution for replenishment of the level of the water table and assuring continuous feeding of nutrient solution to the plants in accord with their assimilation rate.

2. A method of agriculture comprising providing a confined plant supporting medium containing non-assimilatable plant nutrients, establishing a growing crop in said medium, establishing a nutrient solution water table for said medium, and automatically maintaining the level of said water table by intermittently supplying water in accord with the assimilation of said solution by the plants upon the upper surface of said medium thereby creating a periodic percolation of water through the nutrient containing medium to effect an intermittent incremental leaching out of said non-assimilatable nutrients into assimilatable solution charges for replenishment of said water table.

3. A method of growing plants comprising providing a container of desired size having a plant supporting medium containing non-assimilatable plant nutrients, establishing a growing plant crop in said medium, establishing a nutrient solution water table for said medium, and automatically maintaining the level of said water table by intermittently supplying water to the upper surface of said medium in amounts controlled by the lowering of said table in response to plant assimilation of said nutrient solution.

4. An automatic method of growing plants comprising providing a container having a plant supporting medium containing non-assimilatible plant nutrients, supporting plant life in said medium, establishing a nutrient solution water table for said medium, continuously mechanically monitoring the height of said table and automatically intermittently supplying water to the upper surface of said medium in accord with the plant assimilation of said nutrient solution from said established water table to maintain said water table in accord with the monitored intelligence.

5. Agricultural apparatus comprising a container adapted to retain a nutrient solution water table; a growing field supported in said container and comprising an upper layer of natural plant food, a lower layer of inert mineral aggregate, and an intermediate layer of a fine filtering and capillary passage forming aggregate; and means for supplying water intermittently to the upper surface of said upper layer including automatic control means operable to supply said water in accordance with the lowered height of the said water table effected by plant assimilation of said nutrient solution therefrom.

6. The agricultural apparatus of claim 5 wherein said means for supplying moisture comprises a conduit; spray means connected to said conduit; a valve connected to said conduit and adapted to control the flow of water to said spray means through said conduit; and means connected to said valve to automatically open said valve when said height of said water table lowers.

7. Plant culture apparatus comprising an impervious enclosure; a water pervious bulkhead dividing said enclosure into a growing field containing portion and a control chamber; a soil bed in said field portion having an upper nutrient filled plant support layer and a lower aggregate layer submerged in liquid to form a maintainable liquid table out of contact with said nutrient filled plant support layer and adapted to provide moisture solely for assimilation by plants supported in said upper layer; automatic control means including a supply valve, means controlled by said supply valve for depositing water on said field portion to replenish said liquid table and to recharge said control chamber therefrom and means sensitive to the height of liquid in said charged control chamber and operable to supply water to said means for depositing water on said field portion when the level of the water table falls.

8. The plant culture apparatus of claim 7 wherein said soil bed comprises a lower layer of rock, an intermediate layer of sand and an upper nutrient storage layer of humus.

9. The plant culture apparatus of claim 7 wherein said enclosure includes a wall spaced from said bulkhead toward the side of said enclosure remote from said growing field containing portion and dividing said control chamber into a float chamber and a sump chamber within said enclosure said wall being of a height less than the height of said enclosure.

10. The plant culture apparatus of claim 7 wherein the impervious enclosure includes side walls and a roof to isolate the growing field from the ambient air thereby assuring the maintenance of a weed free, natural weather free atmosphere in said apparatus.

11. Plant culture apparatus comprising an enclosing moisture impervious wall structure of predetermined height including a vented bulkhead and overflow partition the latter lying between said bulkhead and a side wall and defining at one side a sump chamber; a first moisture impervious bottom wall connecting the bottom ends of said enclosing wall structure except for the defined sump chamber; a second moisture impervious bottom wall located at a lower level than said first bottom wall connecting the lower ends of the sump chamber defining walls; a growing field fill covering said first bottom wall at said side of said bulkhead away from said sump chamber and comprising a first layer of loose rock defining a water table strata, a second layer of sand defining a filter strata and a third layer of cultured humus defining a plant supporting and nutrient storage strata; sprinkler means supported in spaced relation above said growing field fill and arranged to supply a water spray covering said growing field fill; normally open float actuated valve means supported in spaced relation above the area defined by said vented bulkhead and partition wall with its float depending into the open topped float chamber formed therebetween; and conduit means connecting said normally open, float actuated valve means to a source of water under pressure whereby water will issue from said sprinkler means into said growing field fill and percolate therethrough to the first impervious bottom wall until a water level is reached in said float chamber to cause said float to close said normally open valve and be continuously and automatically maintained at said level without human attention.

12. The plant culture apparatus of claim 11 together with side and roof covering means protecting the growing field fill from the elements, including direct sun light and lamp means for emitting ultra violet and heat rays to promote plant growth.

13. A method of growing plant crops comprising the establishment of a plant crop composed of plants having a substantially identical assimilation rate for water and soluble nutrients in a growing field composed of a layer of plant support and nutrient storage material superposed upon an intermediate layer of fine capillary passage forming aggregate and a base layer of an inert coarse mineral aggregate, establishment throughout said base layer of a water table composed of a water solution of necessary nutrients in contact with the subsurface of said intermediate layer so as to feed said solution to said plant crop at a controlled rate through the capillary action of said intermediate layer and the continuous automatic supervision of and replenishment of the plant crop assimilated nutrient solution in accord with the plants' assimilation thereof throughout the whole plant crop life.

14. Agricultural apparatus comprising a container adapted to retain a water table; a growing field supported in said container and comprising an upper layer of natural plant food, a lower layer of rock, and an intermediate layer of sand; a water filled control chamber formed by said container adjacent said growing field and in communication with said growing field through said container retained water table; and means for supplying water to the upper surface of said upper layer including automatic control means operable to supply said water in accordance with the height of said water table, said means for supplying water comprising a supply conduit, spray means connected to said conduit and arranged to direct a water spray onto said upper surface of said upper layer, a valve in said conduit adapted to control the flow of water to said spray means through said conduit and float means connected to said valve and adapted to automatically open said valve when the height of said water table lowers and close said valve when the normal level of the water table is reached, said float means being disposed on the water in said control chamber.

References Cited in the file of this patent

UNITED STATES PATENTS

| | | |
|---|---|---|
| 1,121,722 | Fessenden | Dec. 22, 1914 |
| 1,718,215 | Burrage | June 25, 1929 |
| 1,793,626 | McCormick | Feb. 24, 1931 |
| 2,031,157 | Gilson | Feb. 18, 1936 |
| 2,445,717 | Richards | July 20, 1948 |
| 2,674,490 | Richards | Apr. 6, 1954 |
| 2,675,817 | Hartlett | Apr. 20, 1954 |

FOREIGN PATENTS

| | | |
|---|---|---|
| 24,939 | Australia | of 1935 |
| 1,104,711 | France | June 15, 1955 |
| 805,205 | Germany | May 10, 1951 |
| 18,374 | Great Britain | of 1904 |

OTHER REFERENCES

"Soilless Growth of Plants" (Ellis et al.), second edition, published by Reinhold (N. Y.), 1947, pages 40, 61 through 84, 123, 124, 181, 186, 192, 193, 194, are relied on.